United States Patent [19]

Soulakis et al.

[11] E Re. 30,624

[45] Reissued May 26, 1981

[54] CONTAINER-CARD FILE STRUCTURE

[75] Inventors: George Soulakis, Hormosa Beach; Charles G. Mandala, Rancho Palos Verdes, both of Calif.

[73] Assignee: Eldon Industries, Inc., Hawthorne, Calif.

[21] Appl. No.: 124,120

[22] Filed: Feb. 25, 1980

Related U.S. Patent Documents

Reissue of:

[64] Patent No.: 4,091,918
Issued: May 30, 1978
Appl. No.: 763,802
Filed: Jan. 31, 1977

[51] Int. Cl.[3] ..... B65D 5/50; B65D 85/00

[52] U.S. Cl. ..... 206/45.13; 206/45.18; 206/425; 206/804; 312/271; 312/294

[58] Field of Search ..... 206/45.13, 45.18, 425, 206/804; 220/235; 312/294, 271, 272, 269

[56] References Cited

U.S. PATENT DOCUMENTS

| | | | |
|---|---|---|---|
| 1,234,025 | 7/1917 | Hick | 312/294 |
| 1,291,881 | 1/1919 | Hick | 312/271 |
| 1,488,456 | 3/1924 | Harper | 206/804 |
| 1,973,825 | 9/1934 | Pratt | 312/269 |
| 2,258,666 | 10/1941 | Walker | 206/425 |
| 2,557,048 | 6/1951 | Haase | 220/335 |
| 2,902,327 | 9/1959 | Larsen | 312/13 |

FOREIGN PATENT DOCUMENTS

| | | | |
|---|---|---|---|
| 231991 | 6/1923 | Canada . | |
| 355653 | 1/1936 | Canada . | |
| 256860 | 8/1926 | United Kingdom | 206/45.13 |

*Primary Examiner*—William T. Dixson, Jr.
*Attorney, Agent, or Firm*—Edward D. O'Brian; K. H. Boswell

[57] ABSTRACT

A container having a hollow base and a lid pivotally mounted on the base can be constructed so as to utilize a carrier pivotally mounted on the lid adjacent to the rear of the lid. With this structure when the lid is moved from a closed to an open position the rear of the carrier is elevated. The front of the carrier is pivotally connected to the front of the base through the use of a link which accommodates movement of the carrier toward the rear of the container as the lid is opened. In a preferred utilization of the invention the carrier is shaped so as to carry a "load" consisting of a stack of index cards in such a manner that the index cards are capable of being moved between "storage" positions in which they extend upwardly and rearwardly of the carrier and "open" positions in which they extend upwardly toward the front of the carrier. A plate which in effect forms a part of the link is used to automatically move those cards from an open position into a storage position when the lid is moved from an open position to a closed position.

14 Claims, 8 Drawing Figures

CONTAINER-CARD FILE STRUCTURE

Matter enclosed in heavy brackets [ ] appears in the original patent but forms no part of this reissue specification; matter printed in italics indicates the additions made by reissue.

BACKGROUND OF THE INVENTION

The invention set forth in this specification pertains to a new and improved container structure. It also pertains to a new and improved file structure especially adapted to be utilized with a stack of index cards utilizing this container structure as an integral part of the file structure.

The field of containers is probably as old as the history of civilization. As industrialized society has developed a wide variety of different containers have been developed for various specialized types of applications. The containers of the present invention are primarily related to known types of containers which are utilized in order to elevate for display or utilitarian purposes what may be referred to as a "load." This word "load" is used herein in a generic sense so as to designate virtually any article which is normally packaged or articles which are so packaged together in such a manner that as a container is opened such a "load" is effectively displayed.

Containers which elevate "loads" when the lids on such containers are opened have been constructed in many ways. Many of such prior structures have been relatively undesirable from a mechanical standpoint inasmuch as they have not effectively utilized mechanical expedients such as pivots so as to obtain easy, comparatively friction free movement of a carrier located within the container. Certain of such prior structures have been comparatively complex and expensive to construct. Further, it is not considered that any of such prior containers have been constructed so as to be especially adapted so as to accommodate a stack of cards such as index cards in such a manner that when the lid is opened such index cards are effectively presented for use and in such a manner as to close for storage purposes the stack of cards when the lid on such a container is closed.

BRIEF SUMMARY OF THE INVENTION

A broad objective of the present invention is to provide new and improved containers. Another objective of the present invention is to provide containers as indicated which will effectively elevate a "load" for display or utilitarian purposes when the lids on such containers are opened. The invention is also intended to provide containers which are relatively simple to construct, which are relatively inexpensive, which are relatively easy to use and which are capable of being repeatedly opened and closed with a minimum amount of difficulty.

An objective of the present invention is also to provide new and improved card file structures utilizing or incorporating such containers. A more detailed objective of the invention is to provide card file structures having the advantages of containers in accordance with the invention indicated in the preceding paragraph. Further, however, the invention is intended to provide card file structures for use with index cards which, when opened, display a "stack" of such cards in a condition in which the stack may be effectively "opened up" as it is utilized and which closes the stack automatically as the lid employed with the complete card file structure is moved to a closed position. A further objective is to provide a card file structure as indicated herein which effectively utilizes space when the card file structure is in a closed configuration.

In accordance with this invention these various objectives are achieved by providing a container which includes a hollow base having an open top and spaced front and rear ends, a lid fitting over and enclosing said top of said base, said lid having front and rear ends, a first pivot means pivotally connecting the rear end of the base with the rear end of the lid so that the lid can be rotated about a first axis between a closed position covering the top of the base and an open position in which the lid extends generally in back of the rear end of the base, carrier means having front and rear ends for supporting a load, the carrier means being located generally within the interior of the base when the lid is in the closed position and second pivot means pivotally connecting the rear end of the carrier means to the lid adjacent to the rear end of the lid so that the carrier means is rotated about a second axis which is parallel to the first axis during rotation of the lid in which the improvement comprises:

Link means for use in pivotally supporting the carrier means, the link means extending between the carrier means and the base, third pivot means pivotally connecting the link means and the carrier means so that the carrier means may be rotated relative to the link means about a third axis, said third axis being parallel to the first and second axes, and fourth pivot means pivotally connecting the link means and the base so that the link means may be rotated about a fourth axis relative to the base, the fourth axis being parallel to the first, second and third axes.

When a container as indicated in the preceding is utilized as an integral part of a card file structure the "load" mentioned in the preceding comprises a stack of index cards and the carrier means includes rail means for holding the stack of index cards so that the cards may be moved between storage and open positions. The cards extend upwardly and toward the rear of the carrier means when in the storage position, the cards extend upwardly and toward the front of the carrier means when in the open position. Further, in such a card file structure an integral part of the link means is utilized so as to automatically engage the card of the stack closest adjacent to the front end of the base in order to move any cards in the open position to the storage position when both the link means and the carrier means are rotated as a result of rotation of the lid.

BRIEF DESCRIPTION OF THE DRAWINGS

The invention is best more fully described with reference to the accompanying drawings in which.

It is believed that it will be obvious from a careful consideration of the accompanying drawings and of the remainder of this specification that the card file structure illustrated embodies or utilizes certain operative concepts or principles as are verbally expressed in the appended claims. These same concepts or principles can be easily utilized in a wide variety of somewhat differently constructed and/or somewhat differently appearing containers and/or file structures through the use or exercise of routine engineering skill.

DETAILED DESCRIPTION

Figure 1:
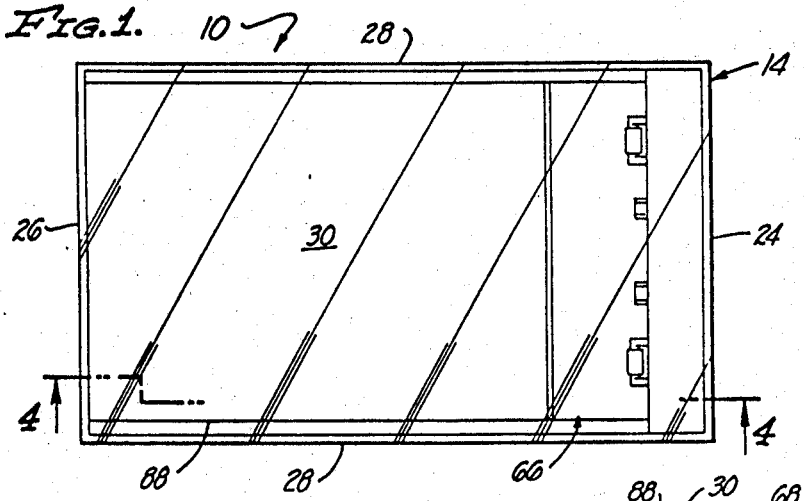
FIG. 1 is a top plan view of a presently preferred embodiment of a card file structure embodying a container in accordance with this invention as an integral part of such structure.
Figure 2:
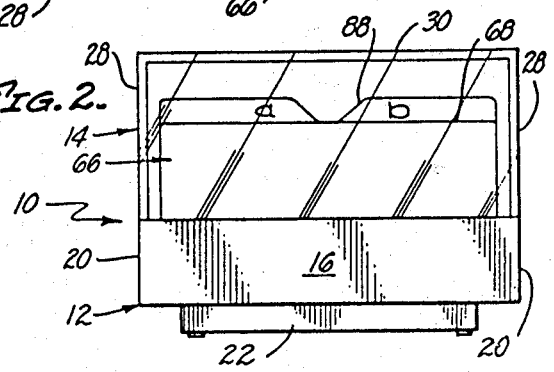
FIG. 2 is an elevational view showing the front end of the card file structure illustrated in the preceding figure.

The card file structure 10 illustrated employs a container (not separately numbered) which includes a hollow base 12 and a hollow lid 14. This base 12 has front and rear ends 16 and 18, respectively, connected by side walls 20 and a bottom 22. Similarly the lid 14 has front and rear ends 24 and 26, respectively, connected by side walls 28 and a top 30. In the embodiment of the structure 10 illustrated the lid 14 is formed out of a somewhat transluscent-transparent material enabling the contents of the container (not separately numbered) including the base 12 and the lid 14 to be imperfectly viewed from the exterior of the lid 14. This is noted in order to explain the fact that various items as hereinafter identified which are generally within or enclosed by the lid 14 are only indicated in a somewhat vague manner in FIGS. 1, 2 and 3 of the drawings. The base 12 in the illustrated structure 10 is opaque.

The lid 14 is pivotally mounted on the base 12 through the use of a "live" hinge-type structure 32 serving as a first pivot means consisting of elongated plates 34 connected by a line 36 of material of reduced cross-sectional thickness serving as a hinge per se. These plates 34 are preferably formed so as to be integral with one another and so as to be connected along the line 36 of a polymer material such as polypropylene which is recognized to have hinge-like properties when utilized as in the hinge structure 32.

Figure 3:
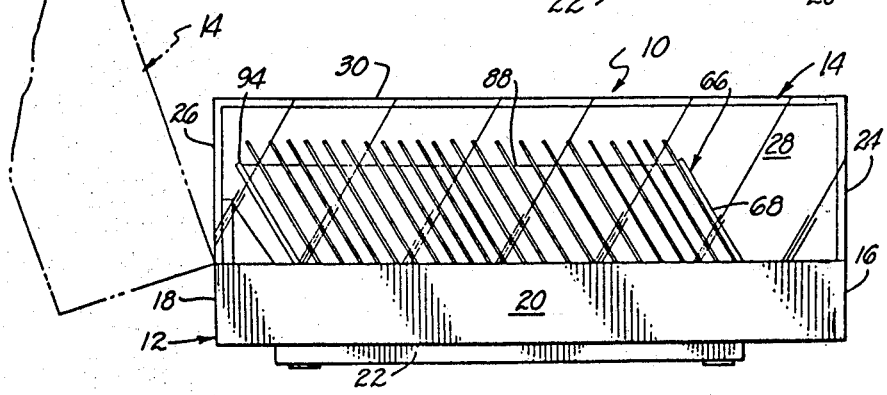
FIG. 3 is a side elevational view of the card file structure shown in the preceding figures in which the position of the lid of the structure when the lid is open is indicated in phantom without any indication of the position of any other parts when this lid is open.
Figure 4:
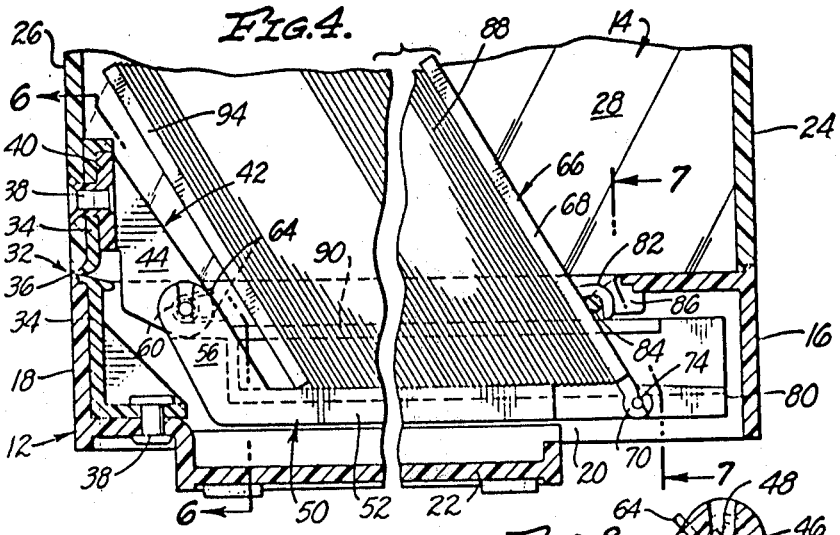
FIG. 4 is a partial cross-sectional view at an enlarged scale taken at line 4—4 of FIG. 1.
Figure 8:
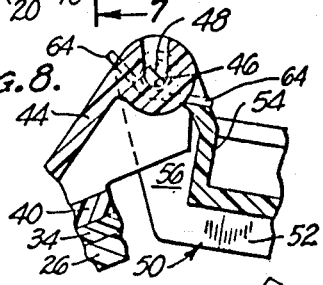
FIG. 8 is a partial cross-sectional view taken at line 8—8 of FIG. 6.
Figure 5:
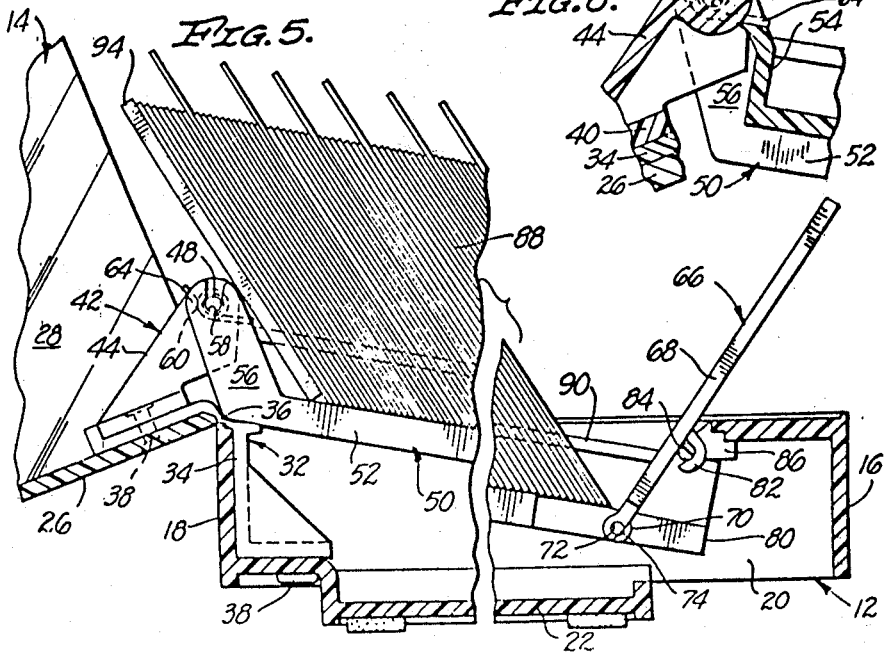
FIG. 5 is a partial cross-sectional view corresponding to FIG. 4 showing the locations of various parts when the lid of the card file structure is open.
Figure 6:
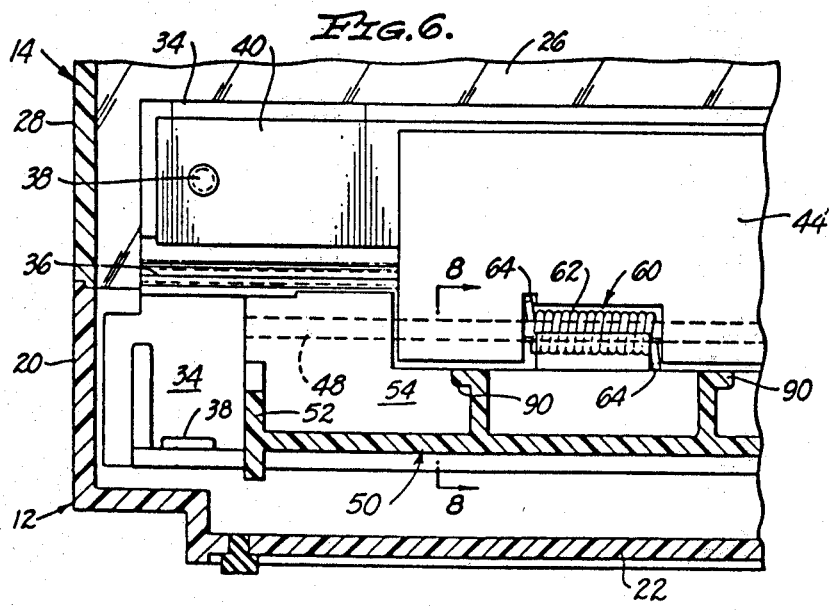
FIG. 6 is a partial cross-sectional view taken at line 6—6 of FIG. 4.
Figure 7:
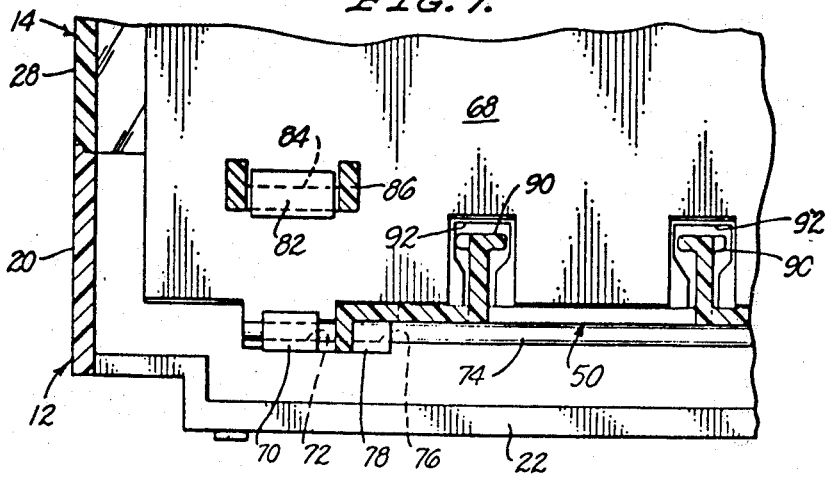
FIG. 7 is a partial cross-sectional view taken at line 7—7 of FIG. 4.

The plates 34 are secured to the base 12 and the lid 14 through the use of appropriate conventional fasteners 38 so that the rear ends 18 and 26 are located as shown and so that the lid 14 may be pivoted about a first axis (not separately indicated in the drawings) which is substantially coincident with the center of the line 36 between a closed position as shown in FIGS. 1 to 4 of the drawings and an open position as indicated in phantom in FIG. 3 of the drawings and in FIG. 5 of the drawings. In the closed position the side walls 28 of the lid 14 rest against the side walls 20 of the base 12 and the front end 24 of the lid 14 rests against the front end 16 of the base 12 so as to support the lid 14 in such a manner so as to close off the interior (not separately numbered) of the base 12.

The fasteners 38 used to mount one of the plates 34 to the rear end 26 of the lid 14 are also utilized to mount a mounting bar 40 upon the rear end 26 of the lid 14. This mounting bar 40 is an integral part of an arm or arm structure 42 extending generally from the center of the rear end 26 of the lid 14 toward the front end 24 of this lid 14. This arm structure 42 has aligned extremities 44 which are shaped so as to provide bearing openings 46. These bearing openings 46 are traversed by a wire-like shaft or axle 48 used to pivotally connect the arm structure 42 to a carrier or carrier structure 50 disposed generally within the base 12.

The carrier structure 50 includes a bottom 52 having an upstanding rear end 54 provided with extremities 56 having bearing openings 58. The axle 48 used extends through these bearing openings 58 in order to pivotally connect the carrier structure 50 to the arm structure 42 in such a manner that as the lid 14 is rotated between open and closed positions there will be relative movement between the carrier structure 50 and the lid 14 such that there is rotation about a second axis (not separately indicated in the drawings) corresponding to the axis of the axle 48. In effect the axle 48 serves as a second pivot or pivot means.

The movement of the lid 14 between open and closed positions will cause the end 54 of the carrier structure 50 to move from a closed or storage position as indicated in FIG. 4 in which the bottom 52 of the carrier structure 50 is closely adjacent to the bottom 22 of the base 12 to a use position in which the bottom 52 of the carrier structure 50 extends at an angle to the bottom 22 of the base 12. This repositioning of the carrier structure 50 is accomplished in part by virtue of the fact that the arm structure 42 extends from the lid 14 in such a manner as to be below and in front of the line 36 of the hinge structure 32 when the lid 14 is closed. When the lid 14 is open the extremities 44 are elevated so that the axle 48 connecting the carrier structure 50 with the arm structure 42 is generally above and slightly to the rear of the line 36 of the hinge structure 32. This is considered to be important or significant in obtaining a weight distribution enabling the lid 14 to remain in an open position.

The arm structure 42 and the carrier structure 50 are also connected by a spring 60 which serves to bias the lid 14 in such a manner as to tend to prevent the lid 14 from rapidly closing. This spring 60 is a coil spring consisting of a coiled section 62 located around the axle 48 between the extremities 44. It has ends 64 which engage the arm structure 42 and the carrier structure 50 so as to tend to bias the lid 14 relative to the carrier structure 50 toward the open position of the lid 14.

A link structure 66 is used for several purposes in the complete card file structure 10. This link structure 66 is essentially an elongated plate 68 having lower most extremities 70 provided with bearing openings 72. These openings 72 are traversed by a second axle 74. This second axle 74 also extends through bearing openings 76 formed in enlarged extremities 78 on the bottom 52 of the carrier structure 50 adjacent to the front end 80 of this carrier structure 50. The second axle 74 together with the extremities 70 and 78 constitute a third pivot means serving to pivotally connect the link structure 66 relative to the carrier structure 50 so that there can be rotation about a third axis (not separately numbered) coincident with the axis of the axle 74 during the use of the complete structure 10.

The link structure 66 also includes outwardly extending bent-over tabs 82 which resiliently engage axle-like rods 84 on an inwardly extending front plate 86 forming a part of the base 12. This plate 86 extends across the front end 16 of the base 12 between the side walls 20 and is spaced from the bottom 22 of the base 12. These rods 84 and tabs 82 constitute a fourth pivot means pivotally connecting the link structure 66 to the base 12 so that there can be relative rotation between the link structure 66 and the base 12 about a fourth axis (not separately indicated in the drawings).

All of the axes of all of the pivot means indicated in the preceding discussion are located parallel to one another so that as the lid 14 is moved between open and closed positions in essence a type of "rocking" action will be imparted to the carrier structure 50. This carrier structure 50 extends so as to be generally within the confines of the base 12 when the lid 14 is in the closed position. When the lid 14 is in an open position the carrier structure 50 extends generally upwardly at an angle from adjacent to the front end 16 of the base 12 so as to effectively display any "load" such as a stack of index cards 88 located upon it.

Preferably the parts of the structure 10 are constructed with reference to the weight of such a "load" so that when the lid 14 is in an open position the weight of the lid 14 will in effect counterbalance the weight of other parts and such a "load" so that both the lid 14 and the carrier structure 50 will remain in a stable position for display and/or utilitarian purposes. This weight distribution effect may be achieved without reference to any action of the spring 60. In the described structure 10 the "balance" of various parts as indicated may be such that the action of the spring 60 serves to balance or hold the lid 14 in an open position.

If desired the carrier structure 50 may be proportioned so as to abut against the arm structure 42 in order to act as a stop or stop means limiting the amount that the lid 14 may be rotated when it is rotated to an open position. Similarly the carrier structure 50 can be proportioned so as to abut against the rear end 18 of the base 12 in order to limit the amount that the lid 14 may be rotated when it is open. Similar stop effects limiting the rotation of the lid 14 can be achieved in a number of other, different ways in accordance with conventional mechanical practice.

In the preferred utilization of the structure 10 the stack of index cards 88 necessitates the location upon the bottom 52 of the carrier structure 50 of conventional rails 90 which are adapted to fit within correspondingly shaped slots 92 of individual cards (not separately numbered) within the stack of cards 88. These rails 90 and slots 92 serve to support the stack of cards 88 in such a manner that the cards (not separately numbered) within the stack 88 may be moved or flipped in a conventional manner between a storage type position as indicated in FIGS. 3, 4 and 5 of the drawings in which such cards extend upwardly from the carrier structure 50 generally toward the rear end 18 of the base 12 at an angle to the carrier structure 50 and an open position in which such cards 88 extend generally upwardly toward the front end 16 of the base 12 from the carrier structure 50.

The manner in which such cards (not separately numbered) within the stack 88 extend in an open position may be readily visualized by considering that such cards may be moved on the carrier structure 50 so as to rest against the plate 68 of the link structure 66. It desired a relatively rigid plate 94 corresponding to an individual one of the cards (not separately numbered) in the stack 88 may be located for support purposes at the end of the stack 88 remote from the link structure 66.

An interesting facet of the structure 10 as employed as a card file structure relates to the orientation of the link structure 66 in the open and closed positions of the lid 14. In the closed position of this lid 14 the carrier structure 50 is located so that the second axle 74 is located beneath the plate 86 of the base 12 generally in front of the tabs 82 and the rods 84. As a consequence of this position when the lid 14 is closed the link structure 66 is held so as to fit against the stack of cards 88 in order to hold such cards in what is referred to in the preceding as a storage position. When the lid 14 is so closed the plate 94 rests against the extremities 56 of the carrier structure 50 so as to space the stack of cards 88 in such a manner that the lid 14 blocks movement of the cards 88 from what may be referred to as the storage position in the preceding.

When the lid 14 is open the various parts described operate so as to rotate the link structure 66 to an orientation as indicated in FIG. 5 in which the link structure is located so as to seemingly invite a user to start flipping cards (not separately numbered) within the stack 88 to an open position for inspection purposes. When the lid 14 is rotated from a closed position the various parts described in the preceding cause the link structure 66 to rotate so that the plate 68 contacts the closest adjacent card (not separately numbered) of the stack of cards 88 so as to gradually move any cards of the stack 88 in an open position to a closed position by the time the lid 14 is completely closed.

It is believed that it will be apparent from the preceding that the structure 10 is a comparatively simple, effective structure which achieves the various objectives of the invention as noted in the preceding discussion.

We claim:

1. A container which includes a hollow base having an open top and spaced front and rear ends, a lid fitting over and enclosing said top of said base, said lid having front and rear ends, a first pivot means pivotally connecting said rear end of said base with said rear end of said lid so that said lid can be rotated about a first axis between a closed position covering said top of said base and an open position in which said lid extends generally in back of said rear end of said base, carrier means having front and rear ends, for supporting a load, said carrier means being located generally within the interior of said base when said lid is in said closed position, second pivot means pivotally connecting said rear end of said carrier means to said lid adjacent to said rear end of said lid so that said carrier means is rotated about a second axis which is parallel to said first axis during rotation of said lid in which the improvement comprises:

link means for use in pivotally supporting said front end of said carrier means, said link means extending between said carrier means and said base, third pivot means pivotally connecting said link means and said carrier means so that said carrier means may be rotated relative to said link means about a third axis, said third axis being parallel to said first and said second axes, fourth pivot means pivotally connecting said link means and said base so that said link means may be rotated about a fourth axis relative to said base, said fourth axis being parallel to said first, second and third axes[.]

*arm means attached to said lid, said arm means having an extremity remote from said lid which extends into the interior of said base beneath said first pivot when said lid is in said closed position and which extends above said first pivot when said lid is in said open position,*

*said second pivot means is located at said extremity of said arm means, and*

*said arm means supporting the rear end of said carrier means so that during movement of said lid from said closed position to said open position the rear end of said carrier means is elevated relative to the front end of said carrier means and is moved rearwardly of its location when said lid is in said closed position.*

[2. A container as claimed in claim 1 including:

arm means attached to said lid, said arm means having an extremity remote from said lid which extends into the interior of said base beneath said first pivot when said lid is in said closed position and which extends above said first pivot when said lid is in said open position, and said second pivot means is located at said extremity of said arm means.]

3. A container as claimed in claim 1 wherein:

the weight of said lid is such that when said lid is in said open position the weight of said carrier means, said load, and said link means will not cause said lid to rotate to said closed position.

4. A container as claimed in claim 1 including:

spring means for biasing said lid toward said open position disposed generally between said lid and said carrier and engaging said lid and said carrier.

5. A container as claimed in claim 4 wherein:

said second pivot means includes an axle, said spring means comprises a coil spring disposed about said axis, one end of said coil spring engaging said lid and the other end of said coil spring engaging said carrier means.

6. A container as claimed in claim 1 wherein:

said load comprises a stack of index cards, said carrier means includes rail means for holding said stack of index cards so that said cards may be moved between storage and open positions, said cards extending upwardly and toward the rear of said carrier means when in said storage position, said cards extending upwardly and toward the front of said carrier means when in said open position.

7. A container as claimed in claim 6 wherein:

said carrier means includes a rear stop means for limiting the amount said cards extend toward the rear of said carrier means when in said storage position.

8. A container as claimed in claim [1] *6* wherein:

said link means serves as a second stop means for limiting the amount said cards can extend forwardly when in said position.

9. A container as claimed in claim 8 wherein:

said fourth axis is above and to the rear of said third axis when said lid is in said open position and said third axis is to the rear of and below said fourth axis when said lid is in said open position so that said link means will engage the card of said stack closest adjacent to said front end of said base in order to move any cards in said open position to said storage position when said link means and said carrier means are rotated as a result of rotation of said lid.

10. A container as claimed in claim 8 wherein:

said link means includes an integrally formed plate which abuts against the card of said stack closest adjacent to the front of said base when said lid is moved from said open to said closed position.

11. A container as claimed in claim 1 wherein:

said load comprises a stack of index cards, said carrier means includes rail means for holding said stack of index cards so that said cards may be moved between storage and open positions, said cards extending upwardly and toward the rear of said carrier means when in said storage position, said cards extending upwardly and toward the front of said carrier means when in said open position, said carrier means includes a rear stop means for limiting the amount said cards extend toward the rear of said carrier means when in said storage position, said link means serves as a second stop means for limiting the amount said cards can extend forwardly when in said position, said fourth axis is above and to the rear of said third axis when said lid is in said position and said third axis is to the rear of and below said fourth axis when said lid is in said open position so that said link means will engage the card of said stack closest adjacent to said front end of said base in order to move any cards in said open position to said storage position when said link means and said carrier means are rotated as a result of rotation of said lid, said link means includes an integrally formed plate which abuts against the card of said stack closest adjacent to the front of said base when said lid is moved from said open to said closed position.

12. A container as claimed in claim 11 including:

arm means attached to said lid, said arm means having an extremity remote from said lid which extends into the interior of said base beneath said first pivot when said lid is in said closed position and which extends above said first pivot when said lid is in said open position, and said second pivot means is located at said extremity of said arm means.

13. A container as claimed in claim 12 wherein:

the weight of said lid is such that when said lid is in said open position the weight of said carrier means, said load, and said link means will not cause said lid to rotate to said closed position.

14. A container as claimed in claim 13 including:

spring means for biasing said lid toward said open position disposed generally between said lid and said carrier and engaging said lid and said carrier, and wherein said second pivot means includes an axle, said spring means comprises a coil spring disposed about said axis, one end of said coil spring engaging said lid and the other end of said coil spring engaging said carrier means.

*15. A container which includes a hollow base having an open top and spaced front and rear ends, a lid fitting over and enclosing said top of said base, said lid having front and rear ends, a first pivot means pivotally connecting said rear end of said base with said rear end of said lid so that said lid can be rotated about a first axis between a closed position covering said top of said base and an open position in which said lid extends generally in back of said rear end of said base, carrier means having front and rear ends, for supporting a load, said carrier means being located gener-*

*ally within the interior of said base when said lid is in said closed position, second pivot means pivotally connecting said rear end of said carrier means to said lid adjacent to said rear end of said lid so that said carrier means is rotated about a second axis which is parallel to said first axis during rotation of said lid in which the improvement comprises:*

*link means for use in pivotally supporting said front end of said carrier means, said link means extending between said carrier means and said base,*

*third pivot means pivotally connecting said link means and said carrier means so that said carrier means may be rotated relative to said link means about a third axis, said third axis being parallel to said first and said second axes,*

*fourth pivot means pivotally connecting said link means and said base so that said link means may be rotated about a fourth axis relative to said base, said fourth axis being parallel to said first, second and third axes,*

*said load comprises a stack of index cards,*

*said carrier means includes rail means for holding said stack of index cards so that said cards may be moved between storage and open positions, said cards extending upwardly and toward the rear of said carrier means when in said storage position, said cards extending upwardly and toward the front of said carrier means when in said open position.*

* * * * *